United States Patent
Shimura (10) Patent No.: US 8,699,431 B2
(45) Date of Patent: Apr. 15, 2014

(54) COMMUNICATION APPARATUS, COMMUNICATION METHOD, AND COMPUTER PROGRAM FOR MAKING COMPUTER EXECUTE COMMUNICATION METHOD

(75) Inventor: Hajime Shimura, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1112 days.

(21) Appl. No.: 12/595,223

(22) PCT Filed: Jun. 24, 2008

(86) PCT No.: PCT/JP2008/061799
§ 371 (c)(1),
(2), (4) Date: Oct. 8, 2009

(87) PCT Pub. No.: WO2009/008275
PCT Pub. Date: Jan. 15, 2009

(65) Prior Publication Data
US 2010/0135228 A1   Jun. 3, 2010

(30) Foreign Application Priority Data
Jul. 9, 2007   (JP) .................................. 2007-179739

(51) Int. Cl.
*H04W 4/00* (2009.01)
*G01R 31/08* (2006.01)

(52) U.S. Cl.
USPC .......................................... 370/329; 370/227

(58) Field of Classification Search
USPC ........................................................ 370/329
See application file for complete search history.

(56) References Cited

U.S. PATENT DOCUMENTS

| 7,450,548 | B2 | 11/2008 | Haustein et al. | |
| 7,493,092 | B2 | 2/2009 | Shida et al. | |
| 2004/0132496 | A1* | 7/2004 | Kim et al. | 455/562.1 |
| 2005/0265470 | A1* | 12/2005 | Kishigami et al. | 375/267 |
| 2005/0276317 | A1* | 12/2005 | Jeong et al. | 375/213 |
| 2006/0045199 | A1* | 3/2006 | Kim | 375/267 |
| 2006/0045200 | A1* | 3/2006 | Bocquet | 375/267 |
| 2006/0105709 | A1* | 5/2006 | Oh et al. | 455/13.1 |
| 2006/0182208 | A1* | 8/2006 | Lee et al. | 375/347 |
| 2006/0234729 | A1 | 10/2006 | Murakami et al. | |
| 2006/0270427 | A1* | 11/2006 | Shida et al. | 455/512 |
| 2007/0037524 | A1* | 2/2007 | Ishii et al. | 455/69 |
| 2007/0064830 | A1* | 3/2007 | Choi et al. | 375/267 |
| 2007/0160014 | A1* | 7/2007 | Larsson | 370/338 |

(Continued)

FOREIGN PATENT DOCUMENTS

| JP | 2003-198651 A | 7/2003 |
| JP | 2004-40801 A | 2/2004 |
| JP | 2005-39807 A | 2/2005 |
| JP | 2005-94255 A | 4/2005 |

(Continued)

OTHER PUBLICATIONS

Japanese Official Action dated Aug. 2, 2011 in corresponding Japanese Patent Application No. 2007-179739.

*Primary Examiner* — Gerald Smarth
(74) *Attorney, Agent, or Firm* — Fitzpatrick, Cella, Harper & Scinto (57) ABSTRACT

When communication apparatuses each having a plurality of antennas perform a data communication using a plurality of transmission channels formed by space division multiplexing, whether or not to perform a highly reliable communication is determined based on the variation of a transmission characteristic in the plurality of transmission channels.

27 Claims, 6 Drawing Sheets

(56) References Cited

U.S. PATENT DOCUMENTS

| | | |
|---|---|---|
| 2008/0151804 A1* | 6/2008 | Wang et al. .................. 370/312 |
| 2008/0298331 A1 | 12/2008 | Shimura |
| 2009/0129354 A1* | 5/2009 | Gupta et al. ................. 370/338 |
| 2009/0213955 A1 | 8/2009 | Higuchi et al. |
| 2011/0044412 A1* | 2/2011 | Murakami et al. ........... 375/347 |
| 2012/0142400 A1* | 6/2012 | Lo et al. ..................... 455/562.1 |

FOREIGN PATENT DOCUMENTS

| | | |
|---|---|---|
| JP | 2005-311902 A | 11/2005 |
| JP | 2006-506860 A | 2/2006 |
| JP | 2006-74563 A | 3/2006 |
| JP | 2006-333283 A | 12/2006 |
| JP | 2007-19880 A | 1/2007 |
| JP | 2007-28569 A | 2/2007 |
| WO | 2006/098008 A1 | 9/2006 |

* cited by examiner

COMMUNICATION APPARATUS, COMMUNICATION METHOD, AND COMPUTER PROGRAM FOR MAKING COMPUTER EXECUTE COMMUNICATION METHOD

This application is a National Stage application under 35 U.S.C. §371 of International Application No. PCT/JP2008/061799, filed on Jun. 24, 2008, which claims priority to Japanese Application No. 2007-179739, filed on Jul. 9, 2007, the contents of each of the foregoing applications being incorporated by reference herein.

TECHNICAL FIELD

The present invention relates to a communication apparatus having a plurality of antennas, a communication method, and a computer program for making a computer execute the communication method.

BACKGROUND ART

A wireless LAN method, which was standardized as the IEEE802.11 specification, has speeded up due to the advent of IEEE802.11b, IEEE802.11 g, and the like, and the standardization of IEEE802.11n that exceeds 100 Mbps is now in progress. In IEEE802.11n, use of a MIMO (Multi-Input Multi-Output) transmission method is examined.

The MIMO transmission method is a technique that increases the transmission capacity and transmission speed in such a manner that both a sender and recipient have a plurality of antenna elements to form a plurality of logical eigen-paths by space division multiplexing (patent reference 1).

As a technique for improving the reliability of wireless transmission by obtaining a sending diversity effect using a plurality of space time block-encoded data, STBC (Space Time Block Coding) is known (patent reference 2). The STBC allows a highly reliable wireless communication, but a maximum communication speed lowers compared to a case in which no STBC is used.

Patent reference 3 describes a technique which switches between a communication using the STBC and a speed-oriented communication without using the STBC according to the priority of sending data and the state of a transmission channel. Note that patent reference 3 calculates a total of eigenvalues calculated from a channel response matrix, and determines that the state of the transmission channel is better with increasing total, and it is worse with decreasing total of eigenvalues.

Patent reference 4 describes the following technique. That is, whether or not to receive a direct wave is determined based on eigenvalues calculated from a channel response matrix. When a direct wave is received, a communication using the STBC is performed; otherwise, a speed-oriented communication without using the STBC is performed.

[Patent Reference 1] Japanese Patent Laid-Open No. 2007-019880

[Patent Reference 2] Japanese Patent Laid-Open No. 2006-074563

[Patent Reference 3] Japanese Patent Laid-Open No. 2006-333283

[Patent Reference 4] Japanese Patent Laid-Open No. 2005-039807

However, in a wireless communication system under an environment in which the influence of multi-path phasing is large, if a communication method is decided based on a temporal transmission characteristic, a communication method that is not suited to the actual environment may be selected. For example, by switching to a communication using the STBC when the transmission characteristic deteriorates instantaneously, the communication speed may lower and the throughput of the whole system may drop compared to a case in which a communication without using the STBC is continued.

The same problem may be posed when the transmission characteristic varies largely along with an elapse of time, e.g., when the sender or recipient wireless apparatus is moving rapidly.

DISCLOSURE OF INVENTION

It is an object of the present invention to select an appropriate communication method in consideration of the variation of a transmission characteristic in a plurality of transmission channels when communication apparatuses each having a plurality of antennas perform a data communication using the plurality of transmission channels formed by space division multiplexing.

According to one aspect of the present invention, a communication method in which a communication apparatus having a plurality of antennas performs a data communication with a communication apparatus as a partner having a plurality of antennas, the method comprising:

a communication step of performing a data communication using a plurality of transmission channels formed by space division multiplexing;

an acquisition step of acquiring information indicating a transmission characteristic in the plurality of transmission channels a plurality of times;

a step of calculating a variation of the transmission characteristic based on the plurality of pieces of acquired information; and a determination step of determining based on the calculated variation of the transmission characteristic whether or not to send data by applying space time block coding to the data.

According to another aspect of the present invention, a communication apparatus capable of executing the communication method.

Further features of the present invention will become apparent from the following description of exemplary embodiments with reference to the attached drawings.

BEST MODE FOR CARRYING OUT THE INVENTION

Preferred embodiments of the present invention will now be described in detail with reference to the accompanying drawings.

<First Embodiment>

An embodiment of the present invention will be described hereinafter with reference to the drawings.

Figure 1:
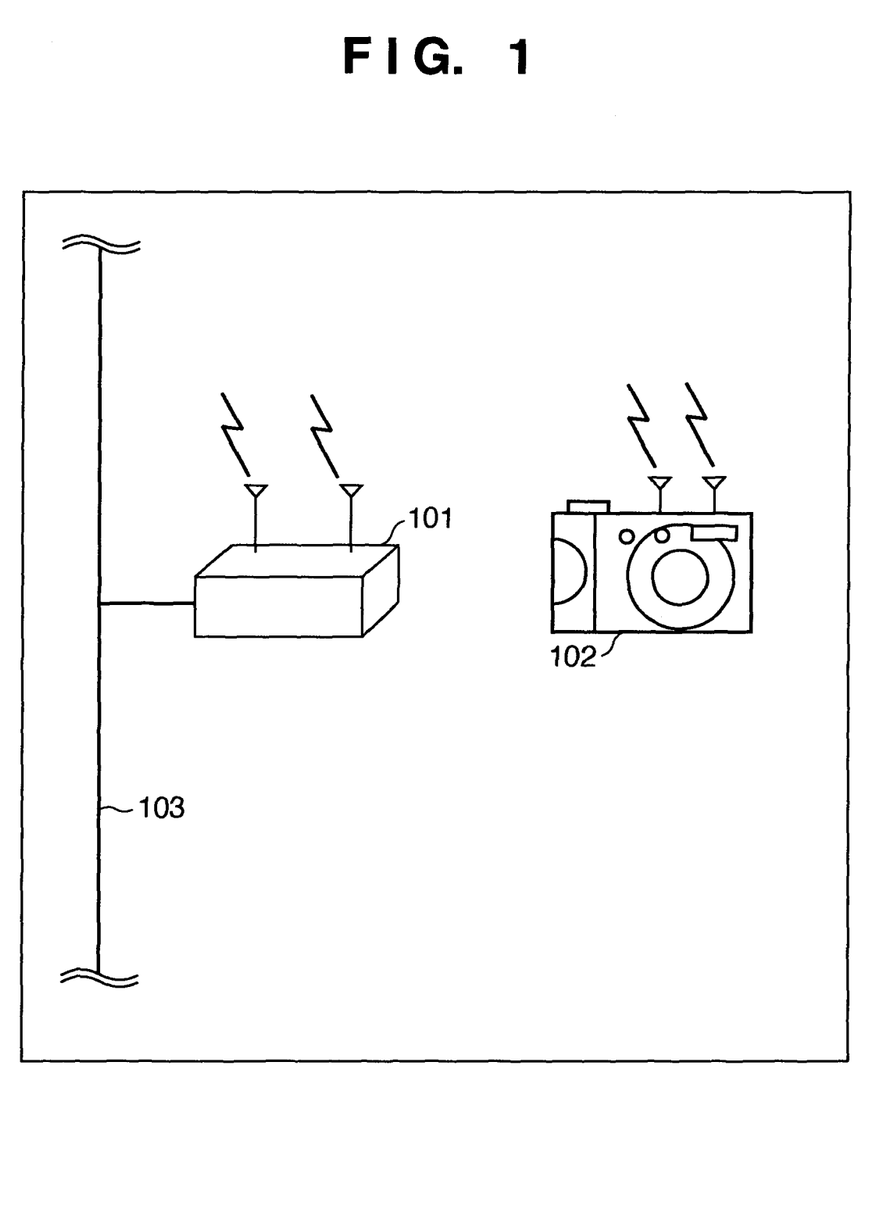
FIG. 1 is a view showing the arrangement of a wireless communication system of each embodiment.

FIG. 1 is a view showing the representative arrangement of a wireless communication system of this embodiment.

Reference numeral 101 denotes a base station (AP; access point), which is connected to a wired LAN 103. Reference numeral 102 denotes a wireless terminal (STA; station). The wireless terminal 102 performs a wireless communication with another wireless terminal via the base station 101. Also, the wireless terminal 102 can communicate with a terminal (not shown) connected to the wired LAN via the base station. Note that the case using the infrastructure mode in which a wireless terminal performs a communication via a base station will be described below. However, the present invention can also be applied to an ad-hoc mode in which wireless terminals directly communicate with each other without the intervention of a base station.

The base station 101 and wireless terminal 102 comprise a wireless LAN function compliant to the IEEE802.11 specification and the IEEE802.11n specification as the extended specification of IEEE802.11.

The IEEE802.11n allows a wireless communication using the MIMO transmission method. As described above, the MIMO transmission method is a technique that increases the transmission capacity and communication speed in such a manner that both a sender and recipient comprise a plurality of antenna elements to form a plurality of logical transmission channels (eigen-paths) by space division multiplexing.

Furthermore, the base station 101 and wireless terminal 102 can perform a communication using the STBC. As described above, the STBC is the technique that improves the reliability of data transmission by obtaining the diversity effect using a plurality of space time block-encoded data.

Figure 6:
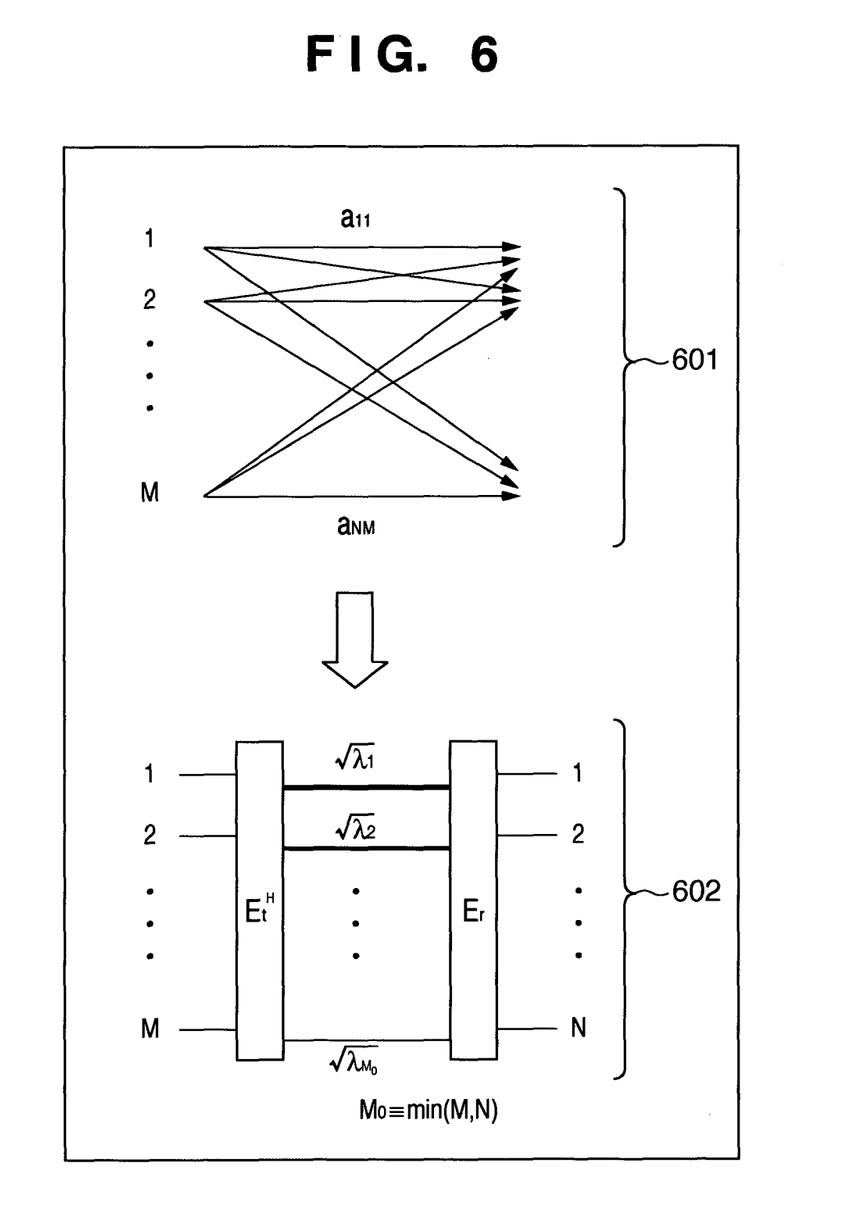
FIG. 6 is a view showing a transmission channel expression of the MIMO.

FIG. 6 is a view for explaining the concept of the MIMO transmission method, which is planned to be adopted in the IEEE802.11n.

Reference numeral 601 denotes transmission channels in a wireless communication when the number of antennas of a sender is M, and that of antennas of a recipient is N. A matrix of $a_{11}$ to $a_{NM}$ is a channel response matrix that represents the transmission characteristic of MIMO channels. An element $a_{nm}$ of the channel response matrix is a transfer function from the m-th sending antenna to the n-th receiving antenna.

Reference numeral 602 denotes an equivalent circuit obtained by executing SVD (Singular Value Decomposition) of the channel response matrix.

$E_t^H$ is an eigenvector of the sending antenna, $E_r$ is an eigenvector of the receiving antenna, and $\sqrt{\lambda_1} \sqrt{\lambda_2} \ldots \sqrt{\lambda_{M_0}}$ ($M_0$; smaller value of N and M) are virtual transmission channels (eigen-paths). Note that $\lambda_1, \lambda_2, \ldots, \lambda_{M_0}$ are called eigenvalues. By setting $E_t^H$ and $E_r$ at the sender and recipient in advance, the sender can transmit M0 signals free from any interference to the recipient. The amplitude gain of each eigen-path is $\sqrt{\lambda_i}$, and the transmission capacity size varies depending on the sizes of the eigen-paths. The eigenvectors $E_t^H$ and $E_r$ can be calculated by acquiring the aforementioned channel response matrix, and making calculations based on the acquired matrix.

In the following description, the processing for acquiring the channel response matrix and that for calculating the eigenvectors and eigenvalues from the acquired channel response matrix will be referred to as MIMO channel estimation processing. By executing the MIMO channel estimation processing, the transmission characteristic of the MIMO channels can be estimated.

Figure 2:
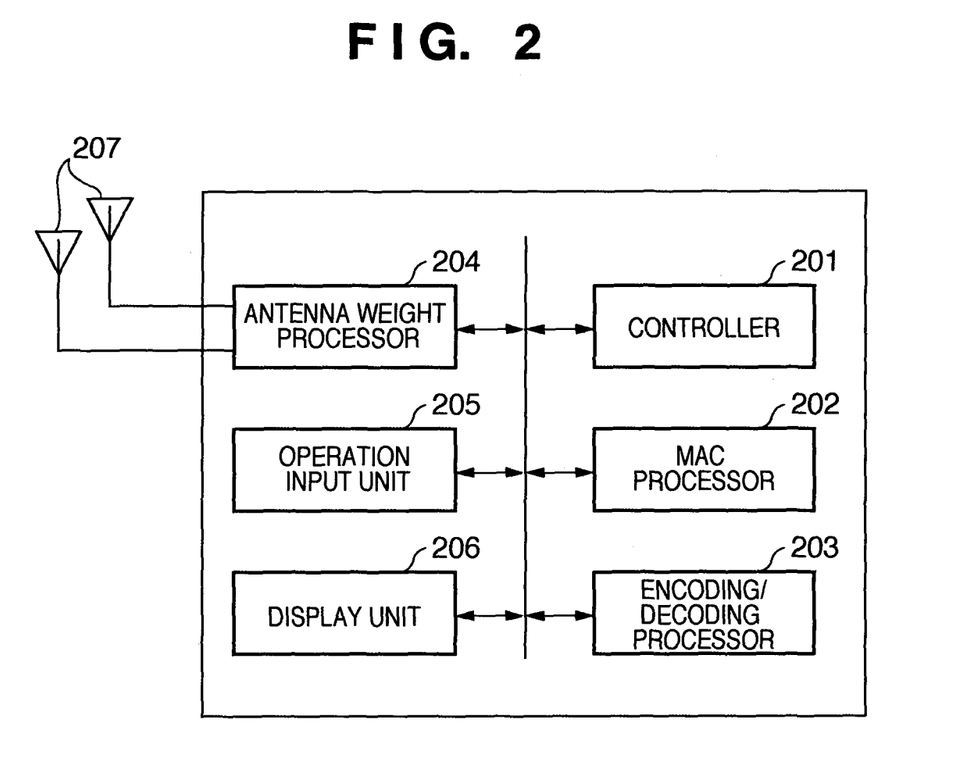
FIG. 2 is a block diagram of a wireless base station 101 and wireless terminal 102.

FIG. 2 is a block diagram of the base terminal 101 and wireless terminal 102.

Reference numeral 201 denotes a controller which has a function of controlling the operation of the overall device.

The controller 201 has a function of executing the MIMO channel estimation processing, and storing MIMO channel estimation processing results for a plurality of times in a storage unit (not shown).

Furthermore, the controller 201 has a counter function of measuring the number of times of execution of MIMO channel estimation processing, and adopts a structure in which the value of a counter is arbitrarily settable.

Reference numeral 202 denotes a MAC processor, which executes processing of a MAC (Medium Access Control) layer according to the IEEE802.11 specification. The MAC processor 202 exchanges a MAC frame with an encoding/decoding processor 203. A data part is stored in a frame body in the MAC frame. Various kinds of information (MIMO channel estimation information, setting information, address information, authentication information, sequence control information, and the like) in a wireless communication channel are also stored in the MAC frame. Note that the MAC processor 202 can analyze a MAC frame specified by IEEE802.11n.

Upon sending data, the encoding/decoding processor 203 divides a MAC frame sent from the MAC processor 202 into streams as many as the number of eigen-paths ($\sqrt{\lambda_1} \sqrt{\lambda_2} \ldots \sqrt{\lambda_{M_0}}$), and sends them to an antenna weight processor 204. Note that the controller 201 notifies the encoding/decoding processor 203 of the number of eigen-paths.

Upon reception of data, the encoding/decoding processor 203 generates a MAC frame from streams as many as the number of eigen-paths, which are sent from the antenna weight processor 204, and sends the MAC frame to the MAC processor 202.

Upon sending data using the STBC transmission method, the encoding/decoding processor 203 sends space time block-encodes data.

Upon receiving data using the STBC transmission method, the encoding/decoding processor 203 receives a plurality of space time block-encoded data, generates a MAC frame from the received data, and sends the MAC frame to the MAC processor 202.

Reference numeral 204 denotes an antenna weight processor, which applies weighting processing to respective sending signals, and sends the weighted signals to antennas 207. The antenna weight processor 204 applies weighting processing to signals received by the antennas 207, and sends the weighted signals to the encoding/decoding processor 203.

Note that the weighting processing is processing for changing the phase and amplitude of each sending signal or receiving signal, and a value based on the eigenvectors $E_t^H$ and $E_r$ is set as a weight.

Reference numeral 205 denotes an operation input unit, which has a function of detecting an input operation by the operator, and notifying the controller 201 of the detection result.

Reference numeral 206 denotes a display unit, which has a function of displaying the status of the wireless terminal and the like for the operator in accordance with an instruction from the controller 201.

The method of controlling whether or not to use the STBC that improves the reliability of data transmission upon making a wireless communication using the MIMO transmission method will be described below.

In this description, assume that a data sender is the wireless terminal 102, and a data recipient is the base station 101.

Figure 3:
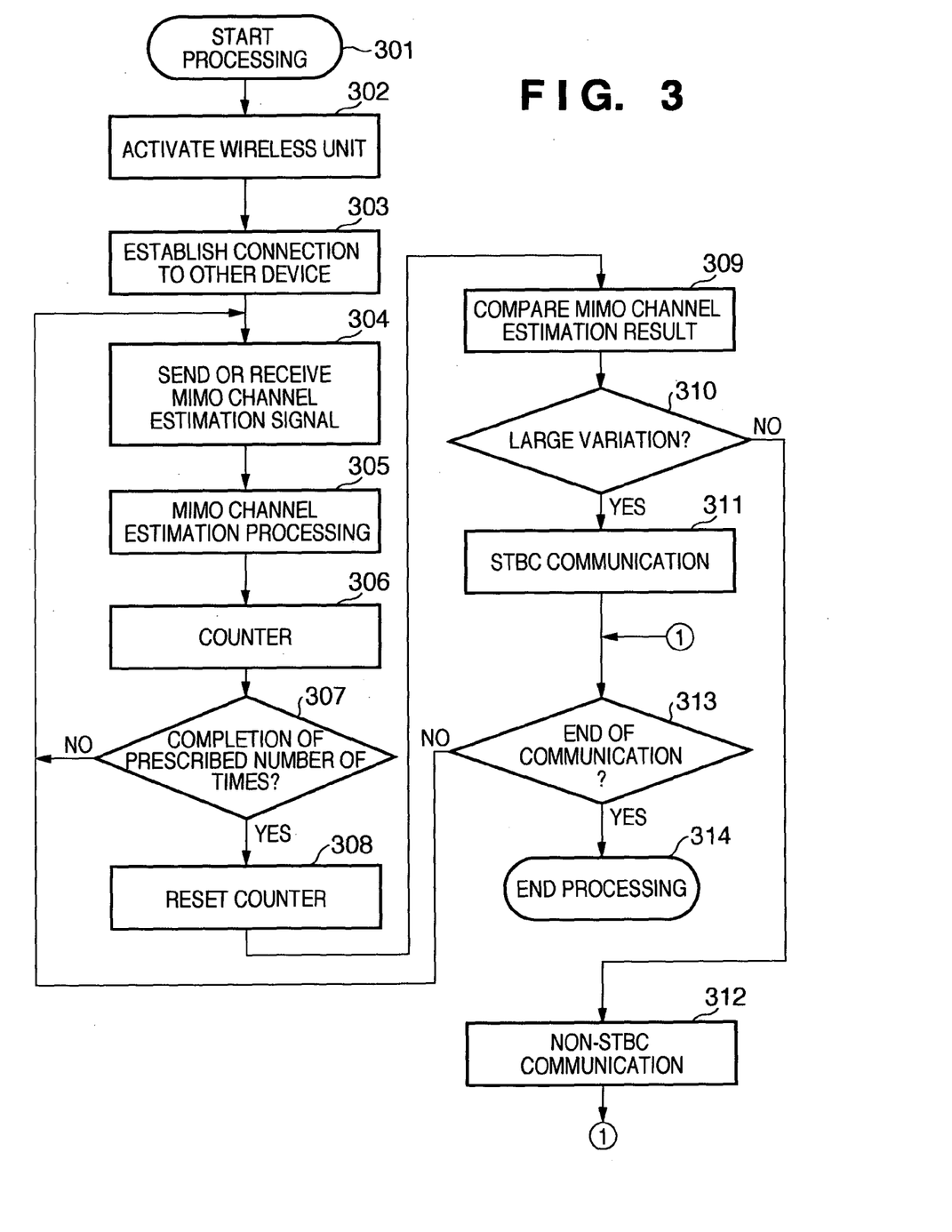
FIG. 3 is an operation flowchart of the wireless terminal 102 according to the first embodiment.

FIG. 3 is an operation flowchart of the wireless terminal 102 according to this embodiment.

In step 302, the wireless terminal 102 activates a wireless unit. In step 303, the wireless terminal 102 joints a network formed by the base station 101 by establishing a wireless connection to the base station 101 as the other device. Note that a connection request required to establish the wireless connection with the base station by the wireless terminal 102, and a response to the connection request include device information of the wireless terminal 102 and base station 101, and such device information includes information indicating whether or not a device supports the MIMO transmission method.

In step 304, the wireless terminal 102 sends a MIMO channel estimation signal to the base station 101. Note that the MIMO channel estimation signal is a signal used to acquire the channel response matrix. As an example of the MIMO channel estimation signal, a scattered preamble signal, STC (Space Time Coding) preamble signal, and the like are available.

Note that the process in step 304 may be executed before the beginning of a data communication or at an arbitrary timing after the beginning of a data communication.

In step 305, the wireless terminal 102 executes MIMO channel estimation processing (to acquire the channel response matrix, and to calculate the eigenvectors and eigen-paths) based on information fed back from the base station 101 which received the MIMO channel estimation signal. The controller 201 of the wireless terminal 102 stores the values of the acquired channel response matrix, and the eigenvectors and eigenvalues calculated from the channel response matrix in the storage unit.

Note that the base station 101 may send the MIMO channel estimation signal to the wireless terminal 102. In this case, in step 304 the wireless terminal 102 receives the MIMO channel estimation signal sent from the base station 101. In step 305, the wireless terminal 102 executes the MIMO channel estimation processing (to acquire the channel response matrix, and to calculate the eigenvectors and eigen-paths) based on the received MIMO channel estimation signal.

In step 306, the controller 201 of the wireless terminal 102 counts up the counter used to measure the number of times of execution of the MIMO channel estimation processing.

The controller 201 of the wireless terminal 102 checks in step 307 if the number of times of execution of the MIMO channel estimation processing measured by the counter reaches the prescribed number of times (plural times). If the MIMO channel estimation processing is not complete yet the prescribed number of times, the process returns to step 304. If the MIMO channel estimation processing is complete the prescribed number of times, the process advances to step 308, and the controller 201 of the wireless terminal 102 resets the counter.

In step 309, the controller 201 of the wireless terminal 102 calculates the variation of the transmission characteristic of MIMO channels based on the channel estimation processing results for the prescribed number of times.

The method of calculating the variation of the transmission characteristic will be exemplified below. As one method, differences of the acquired channel response matrices for the prescribed number of times are calculated and compared to detect how the transmission characteristic of MIMO channels changes as an elapse of time. For example, when the wireless communication system is under an environment in which the influence of multi-path phasing is large, the variation of the channel response matrix becomes large, and a wireless communication becomes unstable. When the sender or recipient wireless apparatus in the wireless communication system is moving rapidly, the variation of the channel response matrix tends to be large.

As described above, the amplitude gain of each eigen-path is $\sqrt{\lambda_i}$, and an eigenvalue $\lambda_i$ can be calculated by executing SVD of the channel response matrix. Therefore, as the second method, the amplitude gains $\sqrt{\lambda_1} \sqrt{\lambda_2} \ldots \sqrt{\lambda_{M_0}}$ of the eigen-paths for respective times are calculated from the acquired channel response matrices for the prescribed number of times, and the variation of the transmission characteristic can be determined by comparing the calculated values.

Also, as described above, in the MIMO transmission method, the eigenvectors $E_t^H$ and $E_r$ can be calculated by executing singular value decomposition (SVD) of the channel response matrix. As the third method, the eigenvectors $E_t^H$ and $E_r$ for respective times are calculated from the acquired channel response matrices for the prescribed number of times, and the variation of the transmission characteristic can be detected by comparing the calculated eigenvector values.

The wireless terminal 102 checks in step 310 if the calculated variation is larger than a predetermined threshold. If the variation is larger than the threshold, it indicates that the transmission characteristic varies largely, and the wireless terminal 102 performs a communication using the highly reliable STBC in step 311. If the variation is small, the wireless terminal 102 performs a high-speed communication without using the STBC in step 312.

The wireless terminal 102 checks in step 313 if a communication ends. If the communication ends, the processing ends in step 314; otherwise, the process returns to step 304. The checking process in step 313 may be executed periodically or randomly.

The case has been described wherein the wireless terminal 102 is a sender, and the base station 101 is a recipient. However, the base station 101 may be a sender, and the wireless terminal 102 may be a recipient. In such case, the base station 101 as the sender determines whether or not to use the STBC.

As described above, according to this embodiment, the variation of the transmission characteristic is evaluated. When the variation is large, a communication is performed using the highly reliable STBC, and when the variation is small, a high-speed communication is performed without using the STBC.

With the above processing, a wireless communication can be performed using a communication method suited to the actual communication environment in the MIMO channel transmission method.

<Second Embodiment>

The first embodiment has explained the processing for evaluating the variation of the transmission characteristic in MIMO channels based on the results of the plurality of number of times of MIMO channel estimation processing, and determining whether or not to use the highly reliable STBC based on the evaluation result.

However, even when the variation of the transmission characteristic is large, if it falls within a range in which wireless devices can sufficiently exchange data, the reliability of data transmission can be sufficiently assured without using the STBC. In such case, when a communication is performed using the STBC, the data transmission speed lowers, and the throughput of the whole wireless communication system drops.

This embodiment will explain a processing method of determining whether or not to use the STBC in consideration of such case. Note that the system arrangement and the block arrangement of a base station 101 and wireless terminal 102 are the same as those (FIGS. 1 and 2) of the first embodiment, a repetitive description thereof will be avoided.

Figure 4:
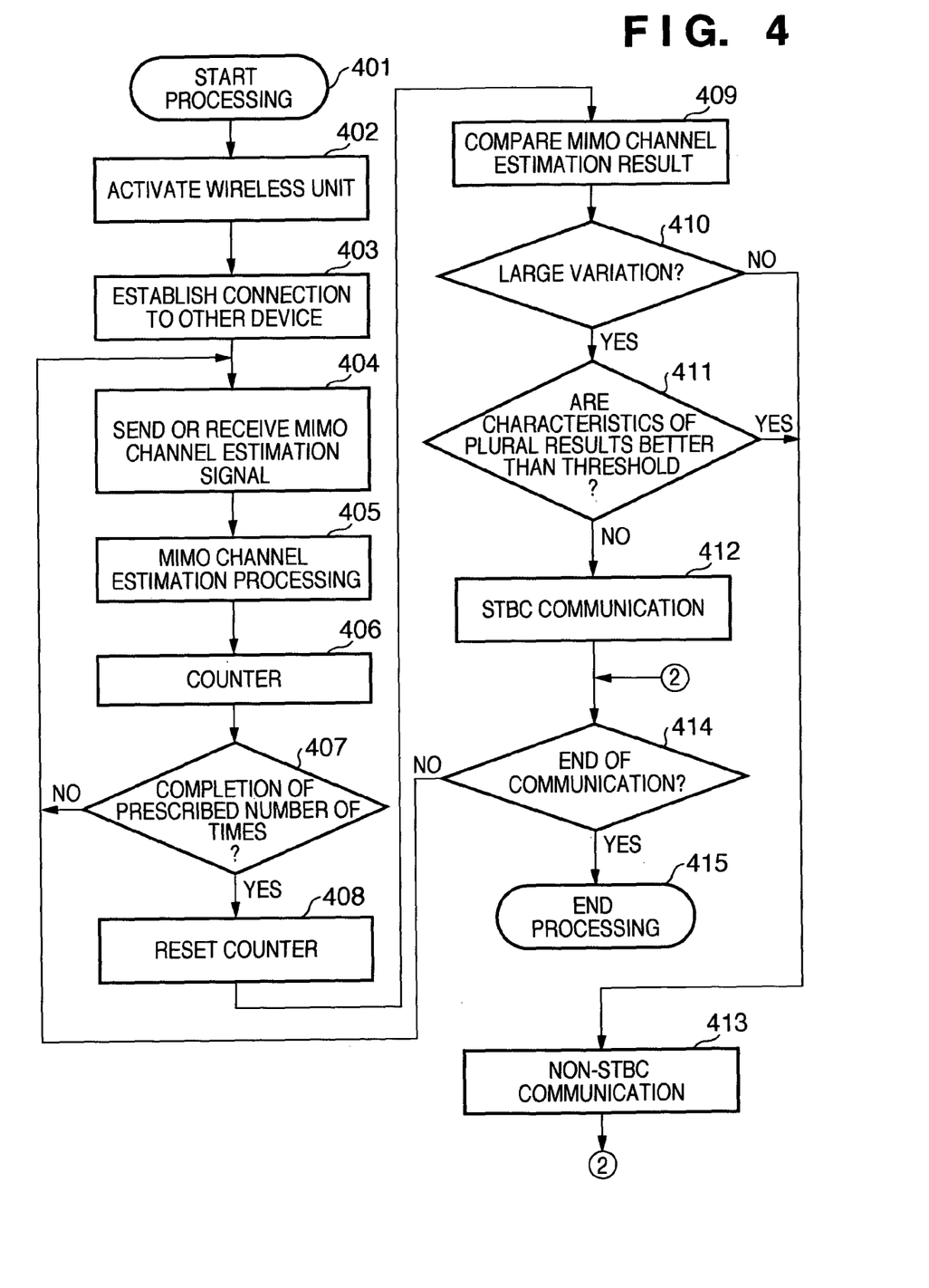
FIG. 4 is an operation flowchart of the wireless terminal 102 according to the second embodiment.

FIG. 4 is an operation flowchart of the wireless terminal 102 of this embodiment. In this embodiment as well, assume that a sender is the wireless terminal 102, and a data recipient is the base station 101.

Steps 401 to 409 are the same as the operations in steps 301 to 309 in the first embodiment (FIG. 3), and a repetitive description thereof will be avoided.

The wireless terminal 102 checks in step 410 if the variation calculated in step 409 is larger than a predetermined threshold. If the variation is smaller than the threshold, the process advances to step 413, and the wireless terminal 102 performs a high-speed communication without using the STBC.

If the variation calculated in step 409 is large, the process advances to step 411. The wireless terminal 102 checks in step 411 based on the eigenvalues calculated from the acquired channel response matrices for the prescribed number of times whether or not the transmission characteristic is better than a predetermined criterion.

The amplitude gain of each eigen-path is $\sqrt{\lambda_i}$, and the large total value of eigenvalues $\lambda_i$ indicates that the transmission capacity between the sender and recipient is large. The total value $(\lambda_1+\lambda_2+\ldots+\lambda_{M0})$ of the eigenvalues is calculated from each acquired channel response matrix, and it is checked if the calculated total value is larger than a predetermined threshold. If the total values for a predetermined number of times of those of the eigenvalues calculated from the acquired channel response matrices for the prescribed number of times are larger than the predetermined threshold, it is determined that the transmission characteristic is good.

If it is determined that the transmission characteristic is better than the predetermined criterion, the process advances to step 413, and the wireless terminal 102 performs a high-speed communication without using the STBC. If it is determined that the transmission characteristic is worse than the predetermined criterion, the process advances to step 412, and the wireless terminal 102 performs a highly reliable communication using the STBC.

The wireless terminal 102 checks in step 414 if a communication ends. If the communication ends, the processing ends in step 415; otherwise, the process returns to step 404. The checking process in step 414 may be executed periodically or randomly.

As described above, according to this embodiment, even when the transmission characteristic varies largely, if the variation falls within the range in which the wireless devices can sufficiently exchange data, a communication is performed without using the STBC. In this way, the data transmission speed can be prevented from lowering by performing a communication using the STBC when the reliability of data transmission can be assured without using the STBC.

<Third Embodiment>

This embodiment will explain a processing example for controlling the transmission rate depending on whether or not to use the STBC. As described above, the STBC can assure a highly reliable communication by obtaining the diversity effect. In case of using the STBC in the MIMO transmission method, the diversity gain can be obtained according to the number of sending antennas and that of receiving antennas. Therefore, upon transition from a communication without using the STBC to that using the STBC, even when a transmission rate higher than that used in the communication without using the STBC is used, the reliability of data transmission can be assured. Using the higher transmission rate, the throughput of the whole system can be improved.

Note that the transmission rate to be described in this embodiment can be controlled by changing a subcarrier modulation method of OFDM (Orthogonal Frequency Division Multiplexing) and the encoding ratio of convolution encoding. More specifically, four types of modulation methods, i.e., BPSK, QPSK, 16QAM, and 64QAM, are prepared, and two types of encoding ratios, i.e., 1/2 and 3/4, are prepared. By combining these modulation methods and encoding ratios, a total of eight combinations of transmission rates can be realized. In order to realize a maximum transmission rate, 64QAM may be used as the modulation method, and 3/4 may be used as the encoding ratio. In this case, error resistance lowers compared to other combinations. Hence, in order to realize more reliable transmission, 16QAM, QPSK, and BPSK may be selected as the modulation method step by step. As for the encoding ratio, 1/2 can assure higher error resistance than 3/4.

A processing example of this embodiment will be described below. Note that the system arrangement and the block arrangement of a base station 101 and wireless terminal 102 are the same as those (FIGS. 1 and 2) of the first embodiment, a repetitive description thereof will be avoided.

Figure 5:
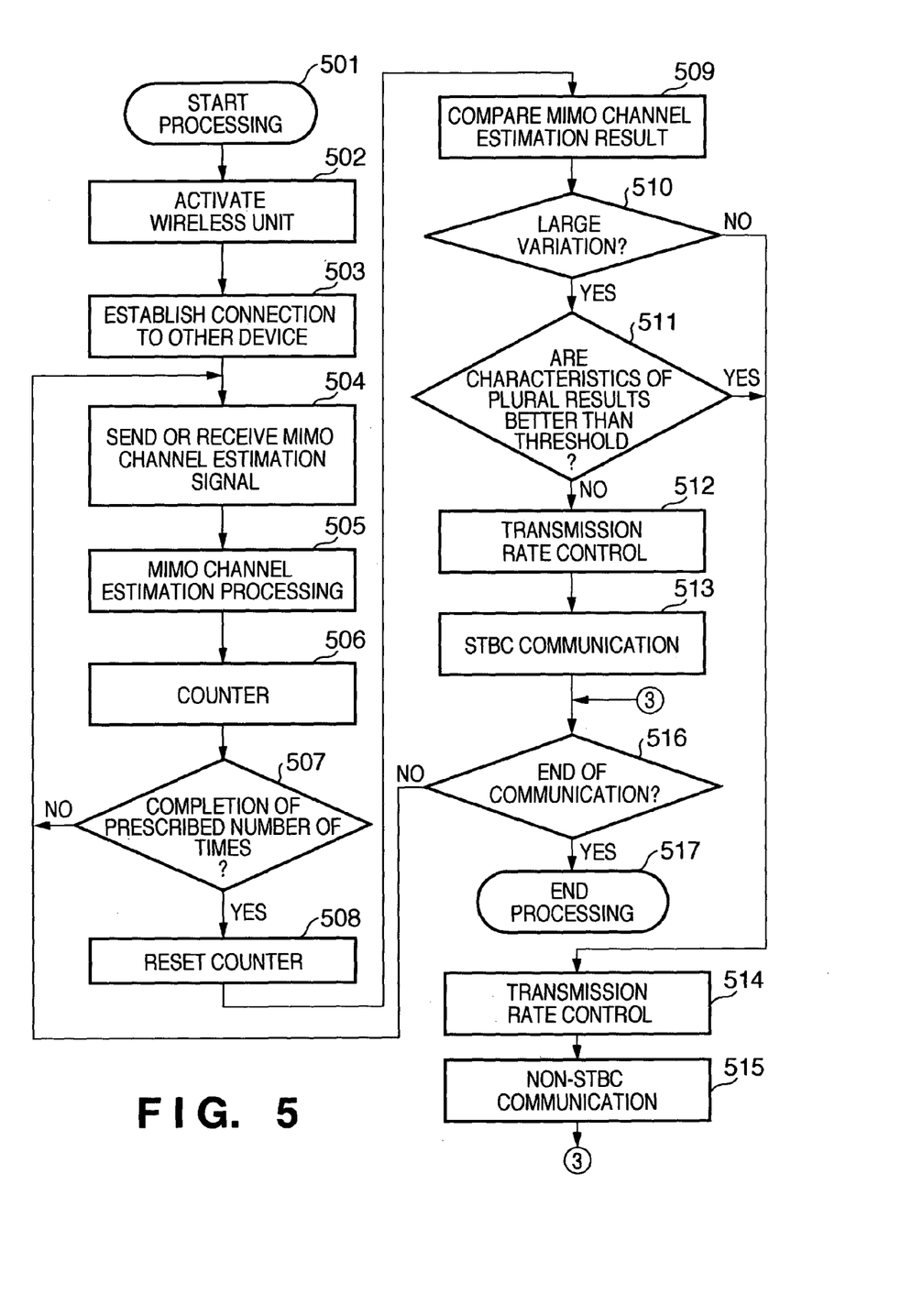
FIG. 5 is an operation flowchart of the wireless terminal 102 according to the third embodiment.

FIG. 5 is an operation flowchart of the wireless terminal 102 of this embodiment. In this embodiment as well, assume that a sender is the wireless terminal 102, and a data recipient is the base station 101.

Since steps 501 to 510 are the same operations as in steps 401 to 410 in FIG. 4 of the second embodiment, a repetitive description thereof will be avoided.

If the wireless terminal 102 determines in step 511 that the transmission characteristic is worse than the predetermined criterion, the process advances to step 512. In step 512, the wireless terminal 102 switches the transmission rate used so far to a higher transmission rate when it performs a communication without using the STBC until this step. The process advances to step 513, and the wireless terminal 102 performs a communication using the STBC. In this manner, when the STBC is used, by setting a higher transmission ratio, a decrease in transmission speed due to switching to the STBC can be suppressed.

If the wireless terminal 102 determines in step 511 that the transmission characteristic is better than the predetermined criterion, the process advances to step 514. In step 514, the wireless terminal 102 switches the transmission rate used so far to a lower transmission rate when it performs a communication using the STBC until this step. The process advances to step 515, and the wireless terminal 102 performs a communication without using the STBC. In this manner, upon switching to the transmission method without using the STBC, the transmission rate used so far is lowered, thus suppressing the reliability drop of data transmission.

The wireless terminal 102 checks in step 516 if a communication ends. If the communication ends, the processing ends in step 517; otherwise, the process returns to step 504. The checking process in step 516 may be executed periodically or randomly.

If Yes in step 511, the transmission rate control in step 514 may be executed; if No in step 510, the transmission rate control may be skipped. In this way, when the variation of the transmission characteristic is small, a communication can be continued using the high transmission rate. Even when the variation of the transmission characteristic is large, if it falls within the range in which wireless devices can sufficiently exchange data, the reliability drop of data transmission can be suppressed.

The transmission rate control in step 514 may be omitted. That is, upon switching to a communication using the STBC, a high transmission rate may be used. On the other hand, upon switching to a communication without using the STBC, the transmission rate may remain unchanged.

This embodiment has given the description based on the processing sequence shown in FIG. 4 in the second embodiment, but the processing sequence in FIG. 3 in the first embodiment may be used as the base. In such case, the determination process in step 511 is omitted.

As described above, according to this embodiment, upon switching between a communication using the STBC and that without using the STBC, the transmission rate is changed, thereby suppressing a decrease in transmission speed and reliability drop of data.

Note that the above embodiments have exemplified the case using the 802.11n wireless LAN. However, the present invention can also be applied to other wireless communications using the MIMO transmission method.

A recording medium which records a program code of software that implements the functions of the aforementioned embodiments is supplied to a system or apparatus. A computer (CPU or MPU) of the system or apparatus reads out and executes the program code stored in the recording medium, thereby also achieving the object of the present invention.

In this case, the program code itself read out from the recording medium implements the functions of the above-mentioned embodiments, and the recording medium which records the program code constitutes the present invention.

As the recording medium for supplying the program code, for example, a Floppy® disk, hard disk, optical disk, magneto-optical disk, CD-ROM, CD-R, magnetic tape, nonvolatile memory card, ROM, and the like may be used.

The present invention is not limited to the case in which the functions of the aforementioned embodiments are implemented when the computer executes the readout program code. The present invention also includes a case wherein an OS (operating system) running on a computer may execute some or all of actual processes based on an instruction of the program code to implement the functions of the aforementioned embodiments.

Furthermore, the program read out from the recording medium is written in a memory of an expansion board or a function expansion unit, which is inserted in or connected to the computer. After that, a CPU or the like equipped on that function expansion board or unit executes some or all of actual processes, thereby implementing the functions of the aforementioned embodiments.

As described above, in the above description, when a communication apparatus having a plurality of antennas performs a data communication with a communication apparatus as a partner having a plurality of antennas, the data communication is performed using a plurality of transmission channels formed by space division multiplexing. The communication apparatus acquires information indicating the transmission characteristic in the plurality of transmission channels a plurality of times, and calculates the variation of the transmission characteristic based on the plurality of pieces of acquired information. Furthermore, the communication apparatus determines based on the calculated variation of the transmission characteristic whether or not to send data by applying space time block coding to the data.

For example, when the calculated variation of the transmission characteristic is larger than a predetermined threshold, the communication apparatus space time block-encodes data to be sent. However, when the calculated variation of the transmission characteristic is smaller than the predetermined threshold, the communication apparatus does not execute the space time block coding. In this manner, upon making a data communication using a plurality of transmission channels formed by space division multiplexing between communication apparatuses each having a plurality of antennas, whether or not to perform a highly reliable communication can be determined based on the variation of the transmission characteristic in the plurality of transmission channels.

When the calculated variation of the transmission characteristic is larger than the predetermined threshold, the communication apparatus checks based on the information acquired in the acquisition step if the transmission characteristic in the plurality of transmission channels is better than a predetermined criterion. Then, the communication apparatus determines based on the checking result whether or not to execute the space time block coding. The data transmission speed can be prevented from lowering upon making a communication using the space time block coding when the reliability of data transmission can be assured without using the space time block coding.

The communication apparatus switches a transmission rate when it switches between the transmission method which does not execute the space time block coding, and that which executes the space time block coding. For example, upon switching from the transmission method which does not execute the space time block coding to that which executes the space time block coding, a transmission rate is increased. On the other hand, upon switching from the transmission method which executes the space time block coding to that which does not execute the space time block coding, a transmission rate is decreased. In this way, even upon switching the transmission method, the transmission speed and reliability of data can be prevented from lowering beyond necessity, and a communication can be made at an appropriate transmission rate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-179739 filed Jul. 9, 2007, which is hereby incorporated by reference herein in its entirety.

The invention claimed is:

1. A communication method in which a communication apparatus having a plurality of antennas performs a data communication with a communication apparatus as a partner having a plurality of antennas, using a computer to perform the steps of:
   performing a data communication using a plurality of transmission channels formed by space division multiplexing;
   acquiring information indicating a transmission characteristic in the plurality of transmission channels a plurality of times;
   obtaining a variation of the transmission characteristic based on the plurality of pieces of acquired information; and
   determining based on the obtained variation of the transmission characteristic whether or not to send data by a predetermined method obtainable by a transmit diversity effect, wherein in a case that the obtained variation of the transmission characteristic is larger than a predetermined threshold, the communication apparatus sends the data by the predetermined method, and in a case that the obtained variation of the transmission characteristic is smaller than the predetermined threshold, the communication apparatus sends the data by another method different from the predetermined method.

2. The method according to claim 1, further comprising:
a switching step of switching between a transmission method that applies the predetermined method, and a transmission method that applies the other method,
wherein in a case that the transmission method is switched in the switching step, a transmission rate is changed.

3. The method according to claim 2, wherein in a case that the transmission method that applies the other method is switched to the transmission method that applies the predetermined method in the switching step, the transmission rate is increased.

4. The method according to claim 1, wherein in a case that the transmission method that applies the predetermined method is switched to the transmission method that applies the other method in the switching step, the transmission rate is decreased.

5. The method according to any one of claim 1, wherein the information indicating the transmission characteristic acquired in the acquisition step is expressed as a channel response matrix.

6. A non-transitory computer-readable storage medium storing a computer program for making a computer execute a communication method according to claim 1.

7. The method according to claim 1, wherein the predetermined method is space time block coding method.

8. A communication method in which a communication apparatus having a plurality of antennas performs a data communication with a communication apparatus as a partner having a plurality of antennas, using a computer to perform the steps of:
performing a data communication using a plurality of transmission channels formed by space division multiplexing;
acquiring information indicating a transmission characteristic in the plurality of transmission channels a plurality of times;
obtaining a variation of the transmission characteristic based on the plurality of pieces of acquired information; and
determining based on the obtained variation of the transmission characteristic whether or not to send data by a predetermined method obtainable by a transmit diversity effect,
wherein in a case that the obtained variation of the transmission characteristic is larger than a predetermined threshold, whether or not the transmission characteristic in the plurality of transmission channels is better than a predetermined criterion is checked based on the information acquired in the acquisition step, and
wherein the communication apparatus sends the data by the predetermined method based on a checking result.

9. The method according to claim 8, further comprising:
a switching step of switching between a transmission method that applies the predetermined method, and a transmission method that applies the other method,
wherein in a case that the transmission method is switched in the switching step, a transmission rate is changed.

10. The method according to claim 9, wherein in a case that the transmission method that applies the other method is switched to the transmission method that applies the predetermined method in the switching step, the transmission rate is increased.

11. The method according to claim 9, wherein in a case that the transmission method that applies the predetermined method is switched to the transmission method that applies the other method in the switching step, the transmission rate is decreased.

12. The method according to claim 8, wherein the information indicating the transmission characteristic acquired in the acquisition step is expressed as a channel response matrix.

13. The method according to claim 8, wherein the predetermined method is a space time block coding method.

14. A non-transitory computer-readable storage medium storing a computer program for making a computer execute a communication method according to claim 8.

15. The method according to claim 8, wherein the information indicating the transmission characteristic acquired in the acquisition step is expressed as a channel response matrix.

16. A communication apparatus having a plurality of antennas for performing a data communication with a communication apparatus as a partner having a plurality of antennas, comprising:
at least one processor operatively coupled to a memory, serving as:
a communication unit that performs a data communication using a plurality of transmission channels formed by space division multiplexing,
wherein the processor determines whether or not to send data by a predetermined method obtainable by a transmit diversity effect, based on a variation of transmission characteristic in the plurality of transmission channels, and
wherein in a case that the variation of the transmission characteristic is larger than a predetermined threshold, the communication unit sends the data by the predetermined method, and in a case that the variation of the transmission characteristic is smaller than the predetermined threshold, the communication unit sends he data by another method different from the predetermined method.

17. The apparatus according to claim 16, further comprising:
a switching unit that switches between a transmission method that applies the predetermined method, and a transmission method that applies the other method,
wherein in a case that the transmission method is switched by the switching unit, a transmission rate is changed.

18. The apparatus according to claim 17, wherein in a case that the transmission method that applies the other method is switched to the transmission method that applies the predetermined method by the switching unit, the transmission rate is increased.

19. The apparatus according to claim 17, wherein in a case that the transmission method that applies the predetermined method is switched to the transmission method that applies the other method by the switching unit, the transmission rate is decreased.

20. The apparatus according to claim 16, wherein the processor determines the variation of the transmission characteristic in the plurality of transmission channels based on information indicating the transmission characteristic in the plurality of transmission channels,
wherein the information indicating the transmission characteristic is expressed as a channel response matrix.

21. The apparatus according to claim 16, wherein the predetermined method is a space time block coding method.

22. A communication apparatus having a plurality of antennas for performing a data communication with a communication apparatus as a partner having a plurality of antennas, comprising:

at least one processor operatively coupled to a memory, serving as:

a communication unit that performs a data communication using a plurality of transmission channels formed by space division multiplexing, wherein the processor determines whether or not to send data by a predetermined method obtainable by a transmit diversity effect, based on a variation of a transmission characteristic in the plurality of transmission channels, and wherein in a case that the variation of the transmission characteristic is larger than a predetermined threshold, whether or not the transmission characteristic in the plurality of transmission channels is better than a predetermined criterion is checked, and wherein the communication unit sends the data by a predetermined method obtainable by a transmit diversity effect based on a checking result.

23. The apparatus according to claim 22, further comprising:

a switching unit that switches between a transmission method that applies the predetermined method, and a transmission method that applies the other method, wherein in a case that the transmission method is switched by the switching unit, a transmission rate is changed.

24. The apparatus according to claim 23, wherein in a case that the transmission method that applies the predetermined method is switched to the transmission method that applies the other method by the switching unit, the transmission rate is increased.

25. The apparatus according to claim 23, wherein in a case that the transmission method that applies the other method is switched to the transmission method that applies the predetermined method by the switching unit, the transmission rate is decreased.

26. The apparatus according to claim 22, wherein the processor determines the variation of the transmission characteristic in the plurality of transmission channels based on information indicating the transmission characteristic in the plurality of transmission channels, wherein the information indicating the transmission characteristic is expressed as a channel response matrix.

27. The apparatus according to claim 22, wherein the predetermined method is a space time block coding method.

* * * * *